United States Patent
Mueller-Cristadoro et al.

(10) Patent No.: US 11,274,180 B2
(45) Date of Patent: Mar. 15, 2022

(54) USE OF HYDROPHOBICALLY MODIFIED POLYALKANOLAMINES AS WAX INHIBITORS, POUR POINT DEPRESSANT AND ADDITIVE FOR LUBRICANTS

(71) Applicant: BASF SE, Ludwigshafen am Rhein (DE)

(72) Inventors: Anna Maria Mueller-Cristadoro, Ludwigshafen am Rhein (DE); Stefan Frenzel, Ludwigshafen am Rhein (DE); Matthias Fies, Ludwigshafen am Rhein (DE); Edward Bohres, Ludwigshafen am Rhein (DE); Szilard Csihony, Ludwigshafen am Rhein (DE); Xiao Fu, Singapore (SG)

(73) Assignee: BASF SE, Ludwigshafen am Rhein (DE)

( * ) Notice: Subject to any disclaimer, the term of this patent is extended or adjusted under 35 U.S.C. 154(b) by 203 days.

(21) Appl. No.: 16/491,674

(22) PCT Filed: Mar. 5, 2018

(86) PCT No.: PCT/EP2018/055328
§ 371 (c)(1),
(2) Date: Sep. 6, 2019

(87) PCT Pub. No.: WO2018/162403
PCT Pub. Date: Sep. 13, 2018

(65) Prior Publication Data
US 2020/0172674 A1 Jun. 4, 2020

(30) Foreign Application Priority Data
Mar. 9, 2017 (EP) .................................... 17160026

(51) Int. Cl.
| | | |
|---|---|---|
| *C08G 73/02* | (2006.01) | |
| *C09K 8/524* | (2006.01) | |
| *C10G 71/00* | (2006.01) | |
| *C10G 75/00* | (2006.01) | |
| *C10L 1/222* | (2006.01) | |
| *C10L 1/2387* | (2006.01) | |
| *C10L 10/16* | (2006.01) | |
| *C10M 149/14* | (2006.01) | |
| *C10N 30/08* | (2006.01) | |

(52) U.S. Cl.
CPC ............ *C08G 73/024* (2013.01); *C09K 8/524* (2013.01); *C10G 71/00* (2013.01); *C10G 75/00* (2013.01); *C10L 1/2225* (2013.01); *C10L 1/2387* (2013.01); *C10L 10/16* (2013.01); *C10M 149/14* (2013.01); *C10G 2300/304* (2013.01); *C10M 2217/041* (2013.01); *C10N 2030/08* (2013.01)

(58) Field of Classification Search
CPC .............. C10M 149/14; C10M 133/08; C10M 2215/042; C10M 2203/1006; C10M 2217/041; C10L 10/16; C10L 10/14; C10L 1/2387; C10L 1/2225; C08G 73/024; C08G 65/34; C08G 65/48; C09K 8/524; C10N 2030/08; C10G 75/00; C10G 71/00; C10G 2300/304
See application file for complete search history.

(56) References Cited

U.S. PATENT DOCUMENTS

| | | | |
|---|---|---|---|
| 4,448,992 A | 5/1984 | Diery et al. | |
| 4,500,735 A | 2/1985 | Diery et al. | |
| 4,505,839 A | 3/1985 | Bellos et al. | |
| 4,509,954 A | 4/1985 | Ishizaki et al. | |
| 5,234,626 A | 8/1993 | Fikentscher et al. | |
| 5,236,608 A | 8/1993 | Martella et al. | |
| 5,393,463 A | 2/1995 | Fikentscher et al. | |
| 5,478,875 A | 12/1995 | Dubs et al. | |
| 6,497,812 B1 | 12/2002 | Schinski | |
| 8,540,885 B2 | 9/2013 | Ebert et al. | |
| 8,789,466 B2 | 7/2014 | Bruchmann et al. | |
| 2011/0011806 A1* | 1/2011 | Ebert ................... | B01D 17/047 210/708 |
| 2011/0168045 A1 | 7/2011 | Bruchmann et al. | |
| 2013/0150272 A1 | 6/2013 | Sonne et al. | |

FOREIGN PATENT DOCUMENTS

| | | |
|---|---|---|
| DE | 3136281 A1 | 3/1983 |
| DE | 3206459 A1 | 9/1983 |
| EP | 441198 A2 | 8/1991 |
| EP | 0441198 A2 | 8/1991 |
| EP | 444515 A1 | 9/1991 |
| EP | 0444515 A1 | 9/1991 |
| EP | 0565487 A2 | 10/1993 |

(Continued)

OTHER PUBLICATIONS

International Search Report for PCT/EP2018/055328 dated Jun. 1, 2018.
Written Opinion of the International Searching Authority for PCT/EP2018/055328 dated Jun. 1, 2018.
European Search Report for EP Patent Application No. 17160026.5, dated Jul. 19, 2017, 3 pages.
International Search Report for PCT Patent Application No. PCT/EP2018/055328, dated Jun. 1, 2018, 3 pages.

*Primary Examiner* — Vishal V Vasisth
(74) *Attorney, Agent, or Firm* — Faegre Drinker Biddle & Reath LLP

(57) ABSTRACT

Use of hydrophobically modified polyalkanolamines obtainable by condensing at least one trialkanolamine and optionally further condensable monomers and reacting at least one of the terminal OH groups with suitable reactants capable of reacting with OH groups and comprising long chain hydrocarbon groups as wax inhibitor, pour point depressant and additive for lubricants.

19 Claims, No Drawings

(56) References Cited

FOREIGN PATENT DOCUMENTS

| | | |
|---|---|---|
| EP | 1557441 A2 | 7/2005 |
| JP | H10-182572 A | 7/1998 |
| JP | H10182572 A | 7/1998 |
| WO | WO-96/12755 A1 | 5/1996 |
| WO | WO-9612755 A1 | 5/1996 |
| WO | WO-2006/053664 A1 | 5/2006 |
| WO | WO-2006053664 A1 | 5/2006 |
| WO | WO-2009/112379 A1 | 9/2009 |
| WO | WO-2009112379 A1 | 9/2009 |
| WO | WO-2010/037691 A1 | 4/2010 |
| WO | WO-2010037691 A1 | 4/2010 |

* cited by examiner

USE OF HYDROPHOBICALLY MODIFIED POLYALKANOLAMINES AS WAX INHIBITORS, POUR POINT DEPRESSANT AND ADDITIVE FOR LUBRICANTS

CROSS-REFERENCE TO RELATED APPLICATIONS

This application is a national stage application (under 35 U.S.C. § 371) of PCT/EP2018/055328, filed Mar. 5, 2018, which claims benefit of European Application No. 17160026.5, filed Mar. 9, 2017, both of which are incorporated herein by reference in their entirety.

The invention relates to the use of hydrophobically modified polyalkanolamines obtainable by condensing at least one trialkanolamine and optionally further condensable monomers and reacting at least one of the terminal OH groups with suitable reactants capable of reacting with OH groups and comprising long chain hydrocarbon groups as wax inhibitors, pour point depressant and additive for lubricants.

Underground mineral oil formations typically have relatively high temperatures. After the production of the crude oil to the surface, the crude oil produced therefore cools down to a greater or lesser degree according to the production temperature and the storage or transport conditions.

According to their origin, crude oils have different proportions of waxes, which consist essentially of long-chain n-paraffins. According to the type of crude oil, the proportion of such paraffins may typically be 1 to 30% by weight of the crude oil. When the temperature goes below a particular level in the course of cooling, the paraffins can crystallize, typically in the form of platelets. The precipitated paraffins considerably impair the flowability of the oil. The platelet-shaped n-paraffin crystals can form a kind of house-of-cards structure which encloses the crude oil, such that the crude oil ceases to flow, even though the predominant portion is still liquid. The lowest temperature at which a sample of an oil still just flows in the course of cooling is referred to as the "pour point". For the measurement of the pour point, standardized test methods are used. Precipitated paraffins can block filters, pumps, pipelines and other installations or be deposited in tanks, thus entailing a high level of cleaning.

The deposit temperature of oil deposits is generally above room temperature, for example 40° C. to 100° C. Crude oil is produced from such deposits while still warm, and it naturally cools more or less quickly to room temperature in the course of or after production, or else to lower temperatures under corresponding climatic conditions. Crude oils may have pour points above room temperature, so such that crude oils of this kind may solidify in the course of or after production.

Even if the oil cools not to room temperature paraffins may deposit on surfaces in contact with the oil, such as surfaces of oil pipelines if the temperature of such surfaces is too low.

It is known that the pour point of crude oils can be lowered by suitable additives. This can prevent paraffins from precipitating in the course of cooling of produced crude oil. Suitable additives firstly prevent the formation of said house-of-cards-like structures and thus lower the temperature at which the crude oil solidifies. In addition, additives can promote the formation of fine, well-crystallized, non-agglomerating paraffin crystals, such that undisrupted oil transport is ensured. Such additives are referred to as pour point depressants or flow improvers.

It is also known to use suitable additives which prevent paraffins from precipitating on surfaces. Such inhibitors are also known as wax inhibitors. Often, an additive may serve both purposes, i.e. preventing paraffins from precipitating on surfaces and diminishing the pour point of crude oils.

Highly branched, hyperbranched or dendritic polymers, modifications thereof and their use for various purposes are known in the art. It has also been suggested to use such polymers for oilfield applications, e.g. for splitting of oil-water emulsions, or as additives for mineral oil products.

WO 96/12755 A1 discloses an oil-soluble dendrimer-based cold-flow improver comprising a central core linked through a plurality of polar groups to a dendritic body which is linked through a plurality of polar groups to a hydrocarbyl periphery comprising n-alkyl groups comprising 8 to 1000 carbon atoms.

WO 2006/053664 A1 discloses additives for improving the lubricating properties of diesel oils available by esterification of polyglycerins with unsaturated, linear or branched carboxylic acids.

EP 1 557 441 A2 discloses nucleating agents for improving the cold flow properties of paraffin-rich crude oils, oils, lubricants, or fuels. The additives comprise a core of hyperbranched polymers wherein the terminal groups of said hyperbranched polymers are modified with linear, saturated alkyl moieties comprising 8 to 40 carbon atoms.

EP 441 198 A2 discloses a process for the preparation of highly branched or hyperbranched polyalkanolamines, in which the condensation is undertaken in the presence of phosphorous acid and/or hypophosphorous acid. The document furthermore discloses the use of such polyalkanolamines as demulsifiers for oil-in-water emulsions.

Also, the subsequent functionalization of polyalkanolamines is known in the art. This affords terminally functionalized polyalkanolamines. DE 31 36 281 A1 discloses functionalization with bisglycidyl ethers, DE 32 06 459 A1 functionalization with xylene dichlorides, and EP 444 515 A1 discloses functionalization with urea, urea derivatives and urethanes.

WO 2009/112379 A1 discloses alkoxylated polyalkanolamines which may be further derivatized, e.g. by esterification of terminal OH-groups and their use as demulsifiers for oil-in-water emulsions.

WO 2010/037691 A1 discloses modified polyalkanolamines obtainable by esterification of the terminal OH-groups of unmodified polyalkanolamines with carboxylic acids. For esterification WO 2010/037691 A1 specifically mentions dodecanoic acid, hexadecenoic acid, octadecanoic acid and 9-dodecenoic acid. The modified polyalkanolamines are used for manufacturing printing inks and/or printing varnishes. It has not been disclosed to use such modified polyalkanolamines for oilfield applications and/or for manufacturing lubricants.

There is an ongoing demand for improved additives useful as wax inhibitor, flow improver and/or pour point depressant.

It was an object of the present invention to provide such improved additives. Surprisingly, it has been found that branched polyalkanolamines modified with long chain hydrocarbon groups have excellent properties as wax inhibitors and may also be used as additive for fuels and/or lubricants.

Accordingly, it has been found to use hydrophobically modified, branched polyalkanolamines obtainable by the following process (A) condensing at least one trialkanolamine of the general formula $N(R^1-OH)_3$ (Ia) thereby obtaining branched polyalkanolamines (II) comprising terminal OH groups, wherein the $R^1$ moieties are each independently divalent, linear or branched aliphatic hydrocarbon moieties having from 2 to 6 carbon atoms, and (B) reacting at least one of the terminal OH groups with a reagent $R^6$—X (IV), wherein $R^6$ is an aliphatic, linear or branched, saturated or unsaturated hydrocarbon group having 8 to 100 carbon atoms and X is a functional group capable of reacting with OH-groups, as pour point depressants and/or wax inhibitor for crude oil, mineral oil and/or mineral oil products.

In another embodiment of the invention it has been found to use such hydrophobically modified, branched polyalkanolamines as component of lubricating oil compositions and as additive for improving the lubricity of fuel oils.

With regard to the invention, the following can be stated specifically:

Hydrophobically Modified Polyalkanolamines

The hydrophobically modified polyalkanolamines to be used according to the present invention are obtainable by means of a two-stage reaction, in which, in a first reaction stage (A) trialkanolamines of the general formula $N(R^1$—$OH)_3$ (Ia) are reacted with one another in a polycondensation reaction to give a branched polyalkanolamine (II) comprising terminal OH-groups. Optionally, further monomers may be used for the polycondensation.

In a second reaction stage (B), the resulting polyalkanolamine (II) is modified by reacting the terminal OH-groups with suitable reactants capable of reacting with OH groups and comprising hydrocarbon groups thereby obtaining hydrophobically modified polyalkanolamines (III).

The term "polycondensation" in usual manner stands for building up a polymer reacting monomers by elimination of small molecules. In the present case, the OH groups react with each other releasing water and forming ether bonds. Because each trialkanolamine (Ia) comprises three OH groups branched polyalkanolamines are formed.

Stage (A)

The trialkanolamines (Ia) used in stage (A) have the general formulae $N(R^1$—$OH)_3$ (Ia).

The $R^1$ radicals are in each case independently a divalent linear or branched aliphatic hydrocarbon radical having from 2 to 6 carbon atoms, preferably 2 or 3 carbon atoms. Examples of such radicals comprise ethane-1,2-diyl, propane-1,3-diyl, propane-1,2-diyl, 2-methylpropane-1,2-diyl, 2,2-dimethylpropane-1,3-diyl, butane-1,4-diyl, butane-1,3-diyl (=1-methylpropane-1,3-diyl), butane-1,2-diyl, butane-2,3-diyl, 2-methylbutane-1,3-diyl, 3-methylbutane-1,3-diyl (=1,1-dimethylpropane-1,3-diyl), pentane-1,4-diyl, pentane-1,5-diyl, pentane-2,5-diyl, 2-methylpentane-2,5-diyl (=1,1-dimethylbutane-1,3-diyl) and hexane-1,6-diyl. The radicals are preferably ethane-1,2-diyl, propane-1,3-diyl or propane-1,2-diyl.

Of course, mixtures of two or more different trialkanolamines (Ia) may be used.

Examples of preferred trialkanolamines (Ia) comprise triethanolamine, triisopropanolamine and tributan-2-olamine, particular preference is given to triethanolamine.

Besides the trialkanolamines (Ia), further monomers may optionally be used for polycondensation. The term "condensation" shall be understood here, in a customary manner, to mean a reaction in which two functional groups form one covalent bond with elimination of a small molecule, especially water. Such further monomers many be selected from components (Ib), (Ic), and (Id). The total amount of monomers (Ia), (Ib), (Ic), and (Id) is 100%, i.e. besides the monomers (Ia), (Ib), (Ic), and (Id) no further monomers may be present.

Components (Ib) are dialkanolamines having the general formula $R^2$—$N(R^1$—$OH)_2$ (Ib). In the general formula $R^2$—$N(R^1$—$OH)_2$ (Ib) the $R^2$ radical is hydrogen and/or linear or branched aliphatic, cycloaliphatic and/or aromatic hydrocarbon radicals having from 1 to 30 carbon atoms, preferably from 1 to 20 carbon atoms and more preferably from 1 to 10 carbon atoms. Aromatic radicals may of course also have aliphatic substituents. $R^2$ is preferably hydrogen or aliphatic hydrocarbon radicals having from 1 to 4 carbon atoms.

Examples of preferred dialkanolamines (Ib) comprise diethanolamine, N-methyl-diethanolamine, N,N-bis(2-hydroxypropyl)-N-methylamine, N,N-bis(2-hydroxybutyl)-N-methylamine, N-isopropyldiethanolamine, N-n-butyldiethanolamine, N-sec-butyldiethanolamine, N-cyclohexyldiethanolamine, N-benzyldiethanolamine, N-4-tolyldiethanolamine or N,N-bis(2-hydroxyethyl)aniline. Particular preference is given to diethanolamine.

Monomers (Ic) are monomers different from (Ia) and (Ib) and having at least two hydroxyl and/or amino group.

In one embodiment, components (Ic) are polyols of the general formula $R^3(OH)_n$, where n is a natural number from 2 to 4 and $R^3$ is an n-valent linear or branched aliphatic, cycloaliphatic or aromatic hydrocarbon radical having from 2 to 10 carbon atoms.

Examples of such polyols comprise aliphatic polyols such as ethylene glycol, propylene glycol, butylene glycol, glycerol, tri(hydroxymethyl)ethane, tri(hydroxymethyl)propane, sorbitol, neopentyl glycol or pentaerythritol, cycloaliphatic polyols such as 1,4-dihydroxycyclohexane or arylaliphatic polyols such as 1,4-bis(hydroxymethyl) benzene. The polyol is preferably glycerol.

In another embodiment, components (Ic) are polyamines of the general formula $R^4(NHR^5)_m$, where m is a natural number from 2 to 4, $R^4$ is an m-valent linear or branched aliphatic, cycloaliphatic or aromatic hydrocarbon radical having from 2 to 10 carbon atoms, and $R^5$ radicals are each independently H, a hydrocarbon radical as defined for $R^2$, where two $R^5$ radicals together may also be an alkylene group, preferably a linear 1,ω-alkylene group having from 2 to 6 carbon atoms. $R^5$ is preferably H or a methyl group.

Examples of such polyamines comprise ethylenediamine, N,N'-dimethylethylene-diamine, N,N'-diethylethylenediamine, 1,2-diaminopropane, 1,3-diaminopropane, 1,6-diaminohexane, 1,2-diaminocyclohexane, 1,3-diaminocyclohexane, 1,4-diaminocyclohexane or piperazine.

Components (Id) may be used for fine tuning the properties of the polyalkanolamines (III). They may in principle be all mono- or polyfunctional compounds which have functional groups which can react in a condensation reaction with trialkanolamines (Ia), and optionally (Ib) and/or (Ic). Examples of compounds (Id) comprise carboxylic acids, especially dicarboxylic acids, which can form ester groups with the trialkanolamines (Ia).

In general, the amount of trialkanolamines (Ia) shall be at least 50% by weight relating to the total of all monomers (Ia), (Ib), Ic), and (Id) used for polycondensation. Preferably, the amount of (Ia) shall be at least 70% by weight, more preferably at least 80% by weight, and most preferably at least 95% by weight. In one embodiment of the invention only trialkanolamines (Ia) are used as monomers for the polycondensation.

The amount of further compounds (Id) should, though, generally not exceed 5% relating to the total of all monomers used for polycondensation. The amount is preferably less than 1% by weight, more preferably less than 0.5% by weight, and most preferably no further components (Id) are used for the condensation.

The polycondensation of components (Ia) and optionally (Ib), (Ic) and/or (Id) can be carried out by methods known in principle to those skilled in the art while heating the components, with elimination of water. Suitable methods are disclosed, for example, by EP 441 198 A2. It will be appreciated that it is in each case also possible to use mixtures of different components (Ia), (Ib), (Ic) or (Id).

The condensation is performed typically at temperatures of from 120 to 280° C., preferably from 150 to 260° C. and more preferably from 180 to 240° C. The water formed is preferably distilled off. The reaction time is typically from 1 to 72 h, preferably from 2 to 48 h. The degree of condensation can be controlled in a simple manner through the reaction temperature and time.

The polycondensation is preferably carried out in the presence of an acid, preferably phosphorous acid ($H_3PO_3$) and/or hypophosphorous acid ($H_3PO_2$). Preferred amounts are from 0.05 to 2% by weight, preferably from 0.1 to 1% by weight, based on the components to be condensed. In addition to the acid, it is also possible to use additional catalysts, for example, zinc halides or aluminum sulfate, optionally in a mixture with acetic acid, as disclosed, for example by U.S. Pat. No. 4,505,839.

The viscosity of the resulting polyalkanolamines (II) is typically in the range from 1000 to 7 000 mPa·s, preferably from 2000 to 50 000 mPa·s and more preferably from 3000 to 30 000 mPa·s (each measured on the undiluted product at 20° C.).

The number average molar mass $M_n$ of the resulting polyalkanolamines (II) is typically in the range from 250 to 50 000 g/mol, preferably from 1000 to 20 000 g/mol, more preferably from 1500 to 10 000 g/mol. In one embodiment, $M_n$ is from 1500 to 5000 g/mol.

The weight average molar mass $M_w$ of the resulting polyalkanolamines (II) is 1000 to 200000 g/mol, preferably 2000 to 100000 and most preferably 2000 to 80000 g/mol. The $M_w/M_n$ ratio typically is from 1 to 40, preferably from 1 to 20.

The OH number typically is from 200 to 2000 mg KOH/g, preferably 200 to 1000 mg KOH/g.

Stage (B)

The resulting branched polyalkanolamines (II) comprising terminal OH groups are modified in stage (B) by reacting at least one of the terminal OH-groups with suitable reactants capable of reacting with OH groups and comprising aliphatic hydrocarbon groups thereby obtaining hydrophobically modified polyalkanolamines (III).

Preferably, at least 30% of the terminal OH groups are converted into hydrophobically modified groups, more preferably at least 50% and more preferably at least 75%.

The reactants have the general formula $R^6$—X (IV), wherein $R^6$ is an aliphatic, linear or branched, saturated or unsaturated hydrocarbon group having 8 to 100 carbon atoms, preferably 10 to 32 carbon atoms, more preferably 12 to 26, for example 16 to 22 carbon atoms. X is a functional group capable of reacting with OH-groups.

Aliphatic groups $R^6$ may be selected from linear, saturated hydrocarbon groups $R^{6a}$, linear, unsaturated hydrocarbon groups $R^{6b}$, branched, saturated hydrocarbon groups $R^{6c}$, and branched, unsaturated hydrocarbon groups $R^{6d}$.

Examples of saturated linear aliphatic hydrocarbon groups $R^{6a}$ comprise n-octyl-, n-nonyl-, n-decyl-, n-undecyl-, n-dodecyl-, n-tridecyl-, n-tetradecyl-, n-pentadecyl-, n-hexadeycl-, n-heptadecyl-, n-octadecyl-, n-nonadecyl-, n-eicosyl-, n-heneicosyl-, n-docosyl-, n-tricosyl-, n-tetracosyl-, n-pentacosyl- or n-hexacosyl groups or mixtures thereof. In a preferred embodiment, $R^{6a}$ linear saturated aliphatic hydrocarbon group having an even number of carbon atoms from 12 to 26 carbon atoms or mixtures thereof.

Linear unsaturated aliphatic hydrocarbon groups $R^{6b}$ may comprise one or more than one ethylenically unsaturated groups. Examples of unsaturated linear aliphatic hydrocarbon groups comprise in particular groups derived from naturally occurring fatty acids such as palmitoleic acid, oleic acid, elaidic acid, eruic acid, linolenic acid, or arachidonic acid.

Branched aliphatic, saturated hydrocarbon groups $R^{6c}$ are preferably groups derived from oxo alcohols or from Guerbet alcohols. Examples comprise 2-ethyl hexyl-, 3-propyl heptyl groups, 4 butyl nonyl or $C_{17}$ alkyl groups with a mean degree of branching (iso-index) between 2.0 and 4.0, preferably between 2.8 to 3.7.

The skilled artisan may select suitable groups $R^6$ according to his/her needs.

In one embodiment, the groups $R^6$ are groups $R^{6a}$ having 8 to 100 carbon atoms, preferably 10 to 40 carbon atoms, more preferably 16 to 40, for example 16 to 28 carbon atoms. In a preferred embodiment, $R^{6a}$ is an n-octydecyl group.

In one embodiment, the groups $R^6$ are groups $R^{6b}$ having 8 to 100 carbon atoms, preferably 10 to 32 carbon atoms, more preferably 12 to 26, for example 16 to 22 carbon atoms.

In one embodiment, the groups $R^6$ are groups $R^{6c}$ having 8 to 100 carbon atoms, preferably 10 to 32 carbon atoms, more preferably 12 to 26, for example 16 to 22 carbon atoms.

In one embodiment of the invention at least two different groups $R^6$ are selected.

In an embodiment, the groups $R^6$ comprise at least one group $R^{6a}$ and at least one group $R^{6b}$. The proportion $R^{6a}/R^{6b}$ may be from 1:10 to 10:1, preferably from 1:2 to 2:1.

In another embodiment, the groups $R^6$ comprise at least one group $R^{6a}$ and at least one group $R^{6c}$. The proportion $R^{6a}/R^{6c}$ may be from 1:10 to 10:1, preferably from 1:2 to 2:1.

Examples of reactive groups X capable of reacting with OH groups comprise carboxylic acid groups and carboxylic acid ester groups, activated carboxylic acid groups such as carboxylic acid chloride groups, or carboxylic acid anhydrides, isocyanate groups, or halogenides. Examples carboxylic acid ester groups include in monoalkylesters with methanol, ethanol, n-propanol, isopropanol, n-butanol, isobutanole, tert-butanol, pentanol, or hexanol, in preferably ethyl esters. Examples of carboxylic acid anhydrides comprise polyisobutene succininc acid anhydrides (PIBSA), e.g. PIBSA having an $M_n$ of 500 to 1500 g/mole.

Preferred groups X comprise carboxylic acid groups and activated carboxylic acid groups, i.e. the reactants $R^6$—X are carboxylic acids or activated carboxylic acids such as carboxylic acid halogenides $R^6COOR^7$, wherein $R^7$ is selected from the group of F, Cl, Br, I, preferably Cl or Br, and more preferably $R^7$ is Cl. In this embodiment of the invention, the terminal OH-groups of the branched polyalkanolamines (II) are esterified to obtain the hydrophobically modified polyalkanolamines (III).

Besides the reactants $R^6$—X additionally also reactants $R^8$—X (V) may be used, wherein X has the meaning as defined above and $R^8$ is an aliphatic, linear or branched, saturated or unsaturated hydrocarbon group having 1 to 7 carbon atoms. Examples of groups $R^6$ comprise methyl-, ethyl-, n-propyl-, i-propyl, n-butyl-, i-butyl-, t-butyl, n-pentyl, n-hexyl-, and n-heptyl-groups. Preferably not more than 50% of the OH groups may be modified with reactants $R^8$—X, more preferably not more than 25%.

The esterification may be performed at temperatures of from 120 to 280° C., preferably from 120 to 260° C. and more preferably from 180 to 240° C. The water formed is preferably distilled off. The reaction time is typically from 1 to 16 h, preferably from 2 to 8 h. The degree of condensation can be controlled in a simple manner through reaction temperature and time.

The esterification may preferably be carried out in the presence of an esterification catalyst. Suitable catalysts for esterification are known in the art and may be selected by the skilled artisan. Examples of catalysts comprise acids such as sulphuric acid, phosphoric acid, hypophosphoric acid, aluminium sulphate hydrate, acidic silica gel and acidic aluminium oxide. Moreover, it is possible to use aluminium compounds of the general formula $Al(OR)_3$ and titanium compounds of the general formula $Ti(OR)_4$, such as for example $Ti(OBut)_4$.

The weight average molar mass $M_w$ of the resulting hydrophobically modified polyalkanolamines (III) is from 1,000 to 200,000 g/mol, preferably from 2,000 to 100,000 g/mol and most preferably from 2,000 to 80,000 g/mol.

The $M_w/M_n$ ratio typically is from 1 to 40, preferably from 1 to 20.

The OH number typically is from 0 to 1000 mg KOH/g, preferably 0 to 200 mg KOH/g, most preferably 0 to 100 mg KOH/g.

In a preferred embodiment of the invention, the hydrophobically modified, branched polyalkanolamines (III) are obtainable by the following process:

(A) condensing at least one trialkanolamine of the general formula $N(R^1—OH)_3$ (Ia) thereby obtaining branched polyalkanolamines (II) comprising terminal OH groups, wherein the $R^1$ moieties are each independently divalent, linear or branched aliphatic hydrocarbon moieties having from 2 to 6 carbon atoms, and (B) reacting at least 50% of the terminal OH groups with a reagent $R^6$—COOH or $R^6COOR^7$, wherein $R^7$ is selected from the group of F, Cl, Br, I, wherein $R^6$ is an aliphatic linear, saturated or unsaturated hydrocarbon group having 10 to 32 carbon atoms thereby obtaining hydrophobically modified polyalkanolamines (III).

Use of the Hydrophobically Modified Polyalkanolamines
Use as Wax Inhibitor

In one embodiment of the invention, the above-detailed hydrophobically modified polyalkanolamines (III) and/or formulations thereof, are used to prevent wax deposits on surfaces in contact with crude oil, mineral oil and/or mineral oil products, preferably for surfaces in contact with crude oil. The use is effected by adding at least one of the above-detailed hydrophobically modified polyalkanolamines (III) to the crude oil, mineral oil and/or mineral oil products.

For the use as additive to prevent wax deposits on surfaces, usually hydrophobically modified polyalkanolamines (III) comprising groups $R^{6a}$ should be used. Examples and preferred groups $R^{6a}$ have been mentioned above. In general, at least 30% of the groups $R^6$ present in the hydrophobically modified polyalkanolamines (III) should be groups $R^{6a}$, preferably at least 50%, more preferably at least 75%. In one embodiment hydrophobically modified polyalkanolamines (III) comprising only groups $R^{6a}$ are used. Preferred groups besides the groups $R^{6a}$ are groups $R^{6b}$ and/or $R^{6c}$. Preferably, the groups more preferably $R^{6a}$ have 16 to 40 carbon atoms, more preferably 16 to 28 carbon atoms.

For the inventive use, the hydrophobically modified polyalkanolamines (III) can be used as such.

Preference is given, however, to using formulations of the hydrophobically modified polyalkanolamines (III) in suitable solvents which may comprise further components as well as the solvents.

Examples of suitable solvents comprise hydrocarbons, in particular hydrocarbons having a boiling point of more than 110° C. Examples of such solvents comprise toluene, xylenes, or technical mixtures of high boiling aromatic solvents.

The concentration of a usable formulation may, for example, be 10 to 50% by weight, preferably 25 to 40% by weight of hydrophobically modified polyalkanolamines (III) prepared in accordance with the invention and optionally further components except for the solvents, this figure being based on the total amount of all components including the solvents. While the formulations are naturally produced in a chemical plant, the ready-to-use formulation can advantageously be produced on site, i.e., for example, directly at a production site for oil.

The hydrophobically modified polyalkanolamines (III) or formulations thereof are typically used in such an amount that the amount of the hydrophobically modified polyalkanolamines (III) added is 50 to 3,000 ppm based on the oil. The amount is preferably 100 to 1,500 ppm, more preferably 250 to 600 ppm and, for example, 300 to 1,000 ppm. The amounts are based on the hydrophobically modified polyalkanolamines (III) itself, not including any solvents present and optional further components of the formulation.

The formulation of the hydrophobically modified polyalkanolamines (III) in suitable solvents may comprise further components.

In a preferred embodiment of the invention, the oil is crude oil and the formulation is injected into a crude oil pipeline. The injection can preferably be effected at the oilfield, i.e. at the start of the crude oil pipeline, but the injection can of course also be effected at another site. More particularly, the pipeline may be one leading onshore from an offshore platform, especially when the pipelines are in cold water, for example having a water temperature of less than 10° C., i.e. the pipelines have cold surfaces.

In a further embodiment of the invention, the oil is crude oil and the formulation is injected into a production well. Here too, the production well may especially be a production well leading to an offshore platform. The injection is preferably effected approximately at the site where oil from the formation flows into the production well. In this way, the deposition of paraffins on surfaces can be prevented.

Use as Pour Point Depressants

The hydrophobically modified polyalkanolamines (III) may be used as pour point depressants for crude oil, mineral oil and/or mineral oil products, preferably as pour point depressant for crude oil by adding at least one of the hydrophobically modified polyalkanolamines (III) detailed above to the crude oil, mineral oil and/or mineral oil products.

Pour point depressants reduce the pour point of crude oils, mineral oils and/or mineral oil products. The pour point ("yield point") refers to the lowest temperature at which a sample of an oil, in the course of cooling, still just flows. For the measurement of the pour point, standardized test methods are used.

Preferred formulations have already been mentioned, and the manner of use is also analogous to the use as a pour point depressant.

For use as pour point depressant, a formulation of the hydrophobically modified polyalkanolamines (III) in suitable solvents may comprise further components. For example, additional wax dispersants can be added to the formulation. Wax dispersants stabilize paraffin crystals which have formed and prevent them from sedimenting. The wax dispersants used may, for example, be alkylphenols, alkylphenol-formaldehyde resins or dodecylbenzenesulfonic acid.

Use in Lubricating Oils

The present invention is also directed to the use of the hydrophobically modified polyalkanolamines (III) in lubricating oils by mixing
(a) at least one base oil component,
(b) the hydrophobically modified polyalkanolamines (III) as defined herein, and
(c) optionally other additives.

It furthermore relates to lubricating oil compositions comprising the hydrophobically modified polyalkanolamines (III) according to the present invention.

The lubricating oil compositions comprise the following components:
(a) at least one base oil component,
(b) the hydrophobically modified polyalkanolamines (III) as defined herein, and
(c) optionally other additives.

For making the lubricating oil compositions the hydrophobically modified polyalkanolamines (III) may be used as such. In an alternative embodiment, a concentrate composition for use in lubrication oils comprising
(i) a diluent, and
(ii) from 30 to 70% by weight of the hydrophobically modified polyalkanolamines (III) may be used.

The amounts of the hydrophobically modified polyalkanolamines (III), the base oil component and the optional additive in the lubricating oil compositions are generally as follows:

In the most generic embodiment the amounts are from 0.1 to 30 weight percent of the hydrophobically modified polyalkanolamines (III), from 70 to 99.9 weight percent base oil, and, from 0.05 to 10 weight percent of additives.

Preferably, the amounts are from 0.5 to 25.0 weight percent of the hydrophobically modified polyalkanolamines (III), from 75 to 99.0 weight percent base oil, and, from 0.1 to 20 weight percent of additives.

More preferably, the amounts are from 1.0 to 20.0 weight percent of the hydrophobically modified polyalkanolamines (III), from 80.0 to 95.0 weight percent base oil, and from 0.5 to 15.0 weight percent of additives.

Most preferably, the amounts are from 1.5 to 15.0 weight percent of the hydrophobically modified polyalkanolamines (III), from 85.0 to 90.0 weight percent base oil, and from 0.8 to 15.0 weight percent of additives.

The weight ratio of the base oil component to the hydrophobically modified polyalkanolamines (III) of the present invention in the lubricating oil compositions according to the present invention is generally in the range of from 4 to 1000, more preferably from 5 to 500, even more preferably from 8 to 200, and most preferably from 10 to 150.

In another preferred embodiment of the present invention, the lubricating oil composition contains from about 0.1 to 20.0 parts by weight, preferably 0.2 to about 15.0 parts by weight, and more preferably about 0.5 to about 10.0 parts by weight, of the neat hydrophobically modified polyalkanolamines (III) (i.e. excluding diluent base oil) per 100 weight of base fluid. The preferred dosage will of course depend upon the base oil.

The lubricating oil compositions according to the present invention include at least one additive which is preferably selected from the group consisting of antioxidants, oxidation inhibitors, corrosion inhibitors, friction modifiers, metal passivators, rust inhibitors, anti-foamants, viscosity index enhancers, additional pour-point depressants, dispersants, detergents, further extreme-pressure agents and/or anti-wear agents. More preferred additives are described in more detail below.

The lubricating oil compositions according to the present invention are characterized by KRL shear stability as measured by the shear stability index based on DIN 51350-6, CEC L-45-99 mod. (20 h), The present invention has a shear loss less than 5%, preferably less than 3%, and more preferably less than 1% after 20 h.

In addition or alternatively, the lubricating oil compositions according to the present invention further display high viscosity index (VI) as measured by ASTM D2270. Preferred viscosity index values of the lubricating oil compositions according to the present invention are at least 180, preferably at least 190, more preferably at least 200, even more preferably at least 205, and most preferably at least 210.

Additionally or alternatively, treat rates of the lubricant oil compositions according to the present invention can preferably be in some selected embodiments in the range of from 1.0 to 30.0, preferably from 2.0 to 25.0, more preferably from 2.5 to 15.0 and most preferably from 3.0 to 10.0 weight percent.

In summary, the lubricating oil compositions provide excellent viscosity characteristics at low and high temperatures and when subjected to high shear stress.

Base Oils

Preferred base oils contemplated for use in the lubricating oil compositions according to the present invention include mineral oils, poly-alpha-olefin synthetic oils and mixtures thereof. Suitable base oils also include base stocks obtained by isomerization of synthetic wax and slack wax, as well as base stocks produced by hydrocracking (rather than solvent extracting) the aromatic and polar components of the crude. In general, both the mineral and synthetic base oils will each have a kinematic viscosity ranging from about 1 to about 40 $mm^2/s$ at 100 degrees centigrade, although typical applications will require each oil to have a viscosity ranging from about 1 to about 10 $mm^2/s$ at 100 degrees centigrade.

The mineral oils useful in this invention include all common mineral oil base stocks. This would include oils that are naphthenic, paraffinic or aromatic in chemical structure. Naphthenic oils are made up of methylene groups arranged in ring formation with paraffinic side chains attached to the rings. The pour point is generally lower than the pour point for paraffinic oils. Paraffinic oils comprise saturated, straight chain or branched hydrocarbons. The straight chain paraffins of high molecular weight raise the pour point of oils and are often removed by dewaxing. Aromatic oils are hydrocarbons of closed carbon rings of a semi-unsaturated character and may have attached side chains. This oil is more easily degraded than paraffinic and naphthalenic oils leading to corrosive by-products.

In reality a base stock will normally contain a chemical composition which contains some proportion of all three (paraffinic, naphthenic and aromatic). For a discussion of types of base stocks, see Motor Oils and Engine Lubrication by A. Schilling, Scientific Publications, 1968, section 2.2 thru 2.5.

The hydrophobically modified polyalkanolamines (III) may be used in paraffinic, naphthenic and aromatic type oils. For example, the poly(meth)acrylate copolymer may be used in Groups I-V base oils. These Groups are well known by those skilled in the art. Additionally, the hydrophobically modified polyalkanolamines (III) may be used in gas to liquid oils.

Gas to liquid oils (GTL) are well known in the art. Gaseous sources include a wide variety of materials such as natural gas, methane, C1-C3 alkanes, landfill gases, and the like. Such gases may be converted to liquid hydrocarbon products suitable for use as lubricant base oils by a gas to liquid (GTL) process, such as the process described in U.S. Pat. No. 6,497,812, the disclosure of which is incorporated herein by reference.

Base oils derived from a gaseous source, hereinafter referred to as "GTL base oils", typically have a viscosity index of greater than about 130, a sulfur content of less than about 0.3 percent by weight, contain greater than about 90 percent by weight saturated hydrocarbons (isoparaffins), typically from about 95 to about 100 weight percent branched aliphatic hydrocarbons, have a pour point of below −15 to −20 C.

The GTL base oils may be mixed with more conventional base oils such as Groups I to V as specified by API. For example, the base oil component of the lubricant compositions may include 1 to 100 percent by weight to a GTL base oil.

Thus a lubricating oil composition may be at least partially derived from a gaseous source and contain the instant hydrophobically modified polyalkanolamines (III) as a pour point depressant.

Oils may be refined by conventional methodology using acid, alkali, and clay or other agents such as aluminum chloride, or they may be extracted oils produced, for example, by solvent extraction with solvents such as phenol, sulfur dioxide, furfural, dichlordiethyl ether, etc. They may be hydrotreated or hydrorefined, dewaxed by chilling or catalytic dewaxing processes, or hydrocracked. The mineral oil may be produced from natural crude sources or be composed of isomerized wax materials or residues of other refining processes. The preferred synthetic oils are oligomers of a-olefins, particularly oligomers of 1-decene, also known as poly-alphaolefins or PAO's.

The base oils may be derived from refined, re-refined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Re-refined oils are obtained by treating used oils in processes similar to those used to obtain the refined oils. These re-refined oils are also known as reclaimed or reprocessed oils and are often additionally processed by techniques for removal of spent additives and oils breakdown products.

Optional Customary Oil Additives

The addition of at least one additional customary oil additive to the lubricating oil compositions of the present invention is possible but not mandatory in every case. The mentioned lubricant compositions, e.g. greases, gear fluids, metal-working fluids and hydraulic fluids, may additionally comprise further additives that are added in order to improve their basic properties still further.

Such additives include: further antioxidants or oxidation inhibitors, corrosion inhibitors, friction modifiers, metal passivators, rust inhibitors, anti-foamants, viscosity index enhancers, additional pour-point depressants, dispersants, detergents, further extreme-pressure agents and/or anti-wear agents.

Such additives are present in the amounts customary for each of them, which range in each case from 0.01 to 10.0 percent by weight, preferably from 0.05 to 3.0 percent by weight, and more preferably from 0.1 to 1.0 percent by weight based on the total weight of the lubricating oil composition. Examples of further additives are given below:

1. Examples of Phenolic Antioxidants:

1.1. Alkylated monophenols: 2,6-di-tert-butyl-4-methylphenol, 2-butyl-4,6-dimethylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(alpha-methylcyclohexyl)-4,6-dimethylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side chain, such as, for example, 2,6-dinonyl-4-methylphenol, 2,4-dimethyl-6-(1'-methyl-undec-1'-yl)-phenol, 2,4-dimethyl-6-(1'-methylheptadec-1'-yl)-phenol, 2,4-dimethyl-6-(1'-methyltridec-1'-yl)-phenol and mixtures thereof;

1.2. Alkylthiomethylphenols: 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol;

1.3. Hydroquinones and alkylated hydroquinones: 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate;

1.4. Tocopherols: alpha-, beta-, gamma or delta-tocopherol and mixtures thereof (like for instance vitamin E);

1.5. Hydroxylated thiodiphenyl ethers: 2,2'-thio-bis(6-tert-butyl-4-methylphenol), 2,2'-thio-bis(4-octylphenol), 4,4'-thio-bis(6-tert-butyl-3-methylphenol), 4,4'-thio-bis(6-tert-butyl-2-methylphenol), 4,4'-thio-bis(3,6-di-sec-amylphenol), 4,4'-bis(2,6-dimethyl-4-hydroxy-phenyl)disulfide;

1.6. Alkylidene bisphenols: 2,2'-methylene-bis(6-tert-butyl-4-methylphenol), 2,2'-methylene-bis(6-tert-butyl-4-ethylphenol), 2,2'-methylene-bis[4-methyl-6-(alpha-methylcyclohexyl)phenol], 2,2'-methylene-bis(4-methyl-6-cyclohexylphenol), 2,2'-methylene-bis(6-nonyl-4-methylphenol), 2,2'-methylene-bis(4,6-di-tert-butylphenol), 2,2'-ethylidene-bis(4,6-di-tert-butylphenol), 2,2'-ethylidene-bis(6-tert-butyl-4-isobutylphenol), 2,2'-methylene-bis[6-(alpha-methylbenzyl)-4-nonylphenol], 2,2'-methylene-bis[6-(alpha, alpha-dimethyl-benzyl)-4-nonylphenol], 4,4'-methylene-bis(2,6-di-tert-butylphenol), 4,4'-methylene-bis(6-tert-butyl-2-methylphenol), 1,1-bis(5-tert-butyl-4- hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)-butyrate], bis(3-tert-butyl-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)-propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane;

1.7. O-, N- and S-benzyl compounds: 3,5,3',5'-tetra-tert-butyl-4,4'-dihydroxydibenzyl ether, octadecyl-4-hydroxy-3,5-dimethylbenzyl-mercaptoacetate, tridecyl-4-hydroxy-3,5-di-tert-butylbenzyl-mercaptoacetate, tris(3,5-di-tert-butyl-4-hydroxybenzyl)amine, bis(4-tert-butyl-3-hydroxy-2,6-dimethylbenzyl)dithioterephthalate, bis(3,5-di-tert-butyl-4-hydroxybenzyl)sulfide, isooctyl-3,5-di-tert-butyl-4-hydroxybenzyl-mercaptoacetate;

1.8. Hydroxybenzylated malonates: dioctadecyl-2,2-bis(3,5-di-tert-butyl-2-hydroxybenzyl)malonate, dioctadecyl-2-(3-tert-butyl-4-hydroxy-5-methylbenzyl)malonate, didodecyl-mercaptoethyl-2,2-bis(3,5-di-tert-butyl-4-hydroxybenzyl) malonate, di[4-(1,1,3,3-tetramethylbutyl)-phenyl]-2,2-bis(3,5-di-tert-butyl-4-hydroxybenzyl) malonate;

1.9. Hydroxybenzyl aromatic compounds: 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetramethylbenzene, 2,4,6-tris(3,5-di-tert-butyl-4-hydroxybenzyl) phenol;

1.10. Triazine compounds: 2,4-bis-octylmercapto-6-(3,5-di-tert-butyl-4-hydroxyanilino)-1,3,5-triazin e, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris(3,5-di-tert-butyl-4-hydroxyphenoxy)-1,2,3-triazine, 1,3,5-tris (3,5-di-tert-butyl-4-hydroxybenzyl)isocyanurate, 1,3,5-tris(4-tert-butyl-3-hydroxy-2,6-dimethylbenzyl)isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl) hexahydro-1,3,5-triazine, 1,3,5-tris(3,5-dicyclohexyl-4-hydroxybenzyl)isocyanurate;

1.11. Acylaminophenols: 4-hydroxylauric acid anilide, 4-hydroxystearic acid anilide, N-(3,5-di-tert-butyl-4-hydroxyphenyl)-carbamic acid octyl ester;

1.12. Esters of beta-(5-tert-butyl-4-hydroxy-3-methylphenyl) propionic acid: with polyhydric alcohols, e.g. with 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis(hydroxyethyl) oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane;

1.13. Esters of beta-(3,5-di-tert-butyl-4-hydroxyphenyl) propionic acid, .gamma.-(3,5-dicyclohexyl-4-hydroxyphenyl) propionic acid, 3,5-di-tert-butyl-4-hydroxyphenylacetic acid: with mono- or polyhydric alcohols, e.g. with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis-hydroxyethyl oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane;

1.14. Amides of beta-(3,5-di-tert-butyl-4-hydroxyphenyl) propionic acid: N,N'-bis(3,5-di-tert-butyl-4-hydroxyphenylpropionyl)hexamethylenediamine, N,N'-bis(3,5-di-tert-butyl-4-hydroxyphenylpropionyl)trimethylenediamine, N,N'-bis(3,5-di-tert-butyl-4-hydroxyphenylpropionyl)hydrazine;

1.15. Ascorbic acid (vitamin C);

1.16. Aminic antioxidants: N,N'-diisopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'dicyclohexyl-p-phenylenediamine, N,N'-diphenyl-p-phenylenediamine, N,N'-di(naphth-2-yl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethyl phenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]-ethane, 1,2-di(phenylamino)propane, (o-tolyl)biguanide, di[4-(1,3'-dimethylbutyl)phenyl]amine, tert-octylated N-phenyl-1-naphthylamine, mixture of mono- and di-alkylated tert-butyl/tert-octyl-diphenylamines, mixture of mono- and di-alkylated nonyidiphenylamines, mixture of mono- and di-alkylated dodecyldiphenylamines, mixture of mono- and di-alkylated isopropyl/isohexyl-diphenylamines, mixtures of mono- and di-alkylated tert-butyldiphenylamines, 2,3-dihydro-3,3-dimethyl-4H-1,4-benzothiazine, phenothiazine, mixture of mono- and di-alkylated tert-butyl/tert-octyl-phenothiazines, mixtures of mono- and di-alkylated tert-octylphenothiazines, N-allylphenothiazine, N,N,N',N'-tetraphenyl-1,4-diaminobut-2-ene, N,N-bis(2,2,6,6-tetramethylpiperidin-4-yl)hexamethylenediamine, bis(2,2,6,6-tetramethylpiperidin-4-yl)sebacate, 2,2,6,6-tetramethylpiperidin-4-one, 2,2,6,6-tetramethylpiperidin-4-ol.

2. Examples of further antioxidants: aliphatic or aromatic phosphites, esters of thiodipropionic acid or thiodiacetic acid or salts of dithiocarbamic acid, 2,2,12,12-tetramethyl-5,9-dihydroxy-3,7,11-trithiamidecane and 2,2,15,15-tetramethyl-5,12-dihydroxy-3,7,10,14-tetrathiahexadecane.

3. Examples of Metal Deactivators. e.g. for Copper:

3.1. Benzotriazoles and derivatives thereof: 2-mercaptobenzotriazole, 2,5-d imercaptobenzotriazole, 4- or 5-alkylbenzotriazoles (e.g. tolutriazole) and derivatives thereof, 4,5,6,7-tetrahydrobenzotriazole, 5,5'-methylene-bis-benzotriazole; Mannich bases of benzotriazole or tolutriazole, such as 1-[di(2-ethylhexyl)aminomethyl]tolutriazole and 1-[di(2-ethylhexyl)aminomethyl]benzotriazole; alkoxyalkylbenzotriazoles, such as 1-(nonyloxy-methyl)benzotriazole, 1-(1-butoxyethyl)-benzotriazole and 1-(1-cyclohexyloxybutyl)-tolutriazole;

3.2. 1,2,4-Triazoles and derivatives thereof: 3-alkyl-(or -aryl-) 1,2,4-triazoles, Mannich bases of 1,2,4-triazoles, such as 1-[di(2-ethylhexyl)aminomethyl]-1,2,4-triazole;

alkoxyalkyl-1,2,4-triazoles, such as 1-(1-butoxyethyl)-1,2,4-triazole; acylated 3-amino-1,2,4-triazoles;

3.3. Imidazole derivatives: 4,4'-methylene-bis(2-undecyl-5-methyl) imidazole and bis[(N-methyl)imidazol-2-yl]carbinol-octyl ether;

3.4. Sulfur-containing heterocyclic compounds: 2-mercaptobenzothiazole, 2,5-dimercapto-1,3,4-thiadiazole, 2,5-dimercaptobenzothiadiazole and derivatives thereof; 3,5-bis[di(2-ethylhexyl)aminomethyl]-1,3,4-thiadiazolin-2-one;

3.5. Amino compounds: salicylidene-propylenediamine, salicylaminoguanidine and salts thereof.

4. Examples of Rust Inhibitors:

4.1. Organic acids, their esters, metal salts, amine salts and anhydrides: alkyl- and alkenylsuccinic acids and their partial esters with alcohols, diols or hydroxycarboxylic acids, partial amides of alkyl- and alkenyl-succinic acids, 4-nonylphenoxyacetic acid, alkoxy- and alkoxyethoxy-carboxylic acids, such as dodecyloxyacetic acid, dodecyloxy (ethoxy)acetic acid and amine salts thereof, and also N-oleoyl-sarcosine, sorbitan monooleate, lead naphthenate, alkenylsuccinic acid anhydrides, e.g. dodecenylsuccinic acid anhydride, 2-(2-carboxyethyl)-1-dodecyl-3-methylglycerol and salts thereof, especially sodium and triethanolamine salts thereof.

4.2. Nitrogen-containing Compounds:

4.2.1. Tertiary aliphatic or cycloaliphatic amines and amine salts of organic and inorganic acids, e.g. oil-soluble alkylammonium carboxylates, and 1-[N,N-bis(2-hydroxyethyl)amino]-3-(4-nonylphenoxy)propan-2-ol;

4.2.2. Heterocyclic compounds: substituted imidazolines and oxazolines, e.g. 2-heptadecenyl-1-(2-hydroxyethyl)-imidazoline;

4.2.3. Sulfur-containing compounds: barium dinonylnaphthalene sulfonates, calcium petroleum sulfonates, alkylthio-substituted aliphatic carboxylic acids, esters of aliphatic 2-sulfocarboxylic acids and salts thereof.

5. Examples of additional viscosity index enhancers: polyacrylates, polymethacrylates, nitrogen containing polymethylmethacrylates, vinylpyrrolidone/methacrylate copolymers, polyvinylpyrrolidones, polybutenes, polyisobutylenes, olefin copolymers such as ethylene-propylene copolymers, styrene-isoprene copolymers, hydrated styrene-isoprene copolymers, styrene/acrylate copolymers and polyethers. Multifunctional viscosity improvers, which also have dispersant and/or antioxidancy properties are known and may optionally be used in addition to the products of this invention.

6. Examples of pour-point depressants: polymethacrylates, ethylene/vinyl acetate copolymers, alkyl polystyrenes, fumarate copolymers, alkylated naphthalene derivatives.

7. Examples of dispersants/surfactants: polybutenylsuccinic acid amides or imides, polybutenylphosphonic acid derivatives, basic magnesium, calcium and barium sulfonates and phenolates.

8. Examples of extreme-pressure and anti-wear additives: sulfur- and halogen-containing compounds, e.g. chlorinated paraffins, sulfurized olefins or vegetable oils (soybean oil, rape oil), alkyl- or aryl-di- or -tri-sulfides, benzotriazoles or derivatives thereof, such as bis(2-ethylhexyl)aminomethyl tolutriazoles, dithiocarbamates, such as methylene-bis-dibutyldithiocarbamate, derivatives of 2-mercaptobenzothiazole, such as 1-[N,N-bis(2-ethylhexyl)aminomethyl]-2-mercapto-1H-1,3-benzothiazole, derivatives of 2,5-dimercapto-1,3,4-thiadiazole, such as 2,5-bis(tert-nonyldithio)-1,3,4-thiadiazole.

9. Examples of coefficient of friction reducers: lard oil, oleic acid, tallow, rape oil, sulfurized fats, amides, amines. Further examples are given in EP-A-0 565 487.

10. Examples of special additives for use in water/oil metal-working fluids and hydraulic fluids: Emulsifiers: petroleum sulfonates, amines, such as polyoxyethylated fatty amines, non-ionic surface-active substances; buffers: such as alkanolamines; biocides: triazines, thiazolinones, tris-nitromethane, morpholine, sodium pyridenethiol; processing speed improvers: calcium and barium sulfonates.

The hydrophobically modified polyalkanolamines (III) according to the present invention are useful as viscosity index improvers in lubricating oil compositions and may be admixed with a base oil and at least one of the above-mentioned additives to form the desired lubricating oil composition. It is also possible to first prepare a concentrate or a so-called "additive pack" comprising the desired spectrum of additives, which can then be subsequently diluted to give the working concentrations for the intended lubricating oil composition.

Lubricating oil compositions containing the hydrophobically modified polyalkanolamines (III) of the present invention may be used in a number of different applications including automatic transmission fluids, manual transmission fluids, hydraulic fluids, greases, gear fluids, metal-working fluids, crankcase engine oil applications and/or shock absorber fluids.

The hydrophobically modified polyalkanolamines (III) of the present invention are useful for the preparation of lubricating oil compositions which have special technical performance characteristics.

Most importantly, the rheology profiles at low temperatures, including the temperature dependency of the kinematic viscosity of the lubricating oil compositions of the present invention over a broad temperature range is excellent as derivable from measuring kinematic viscosity at different temperatures.

In summary, the temperature-dependent viscosity profile in combination with the high shear stability of the lubricating oil compositions according to the present invention represents an unusual spectrum of performance characteristics for a lubricating oil composition because these effects normally negatively affect each other.

The present invention is also directed to a method for improving the shear stability of a lubricating oil composition wherein the method comprises the step of providing the hydrophobically modified polyalkanolamines (III) of the present invention and adding it to a base oil and optional additives to form a lubricating oil composition with improved shear stability.

Lubrication oils containing hydrophobically modified polyalkanoamines of the present invention may be used in automatic transmission fluids, manual transmission fluids, hydraulic fluids, greases, gear fluids, metal-working fluids, engine oil applications and shock absorber fluids.

The invention is illustrated in detail by the examples which follow.

ANALYTICAL METHODS

Molecular Weight

The number average molecular weights and the weight average molecular weights of the samples were determined by gel permeation chromatography using a refractometer as the detector. The mobile phase used was hexafluoroisopropanol (HFIP), the standard employed for determining the molecular weight being polymethylmethacrylate (PMMA).

OH-Number

The OH number was determined in accordance the below reported procedure:

0.5 g of the target polymer was weighted in a glass Erlenmeyer equipped with a magnetic stirrer. The exact amount of polymer was noted. Then, 5 mL of a solution of acetic anhydride at 2,433 mol/L in pyridine was added. When the polymer was solved, the Erlenmeyer was heat at 135° C. during 1 h on a heating plate. 10 mL of distilled water was added with a measuring cylinder and heat for 10 more minutes, then 10 mL of ethanol were added followed by 50 mL of a mixture of toluene/ethanol 1/1. 3-4 drops of phenolphthalein were added and the solution was titrated with a solution of KOH in ethanol at 0.1 mol/L. The OH number (OH #) is given by the following formula:

$$OH\# = \frac{(\text{mL blank} - \text{mL sample})(N_{KOH})(56,1)}{\text{sample weight}}$$

56.1 corresponds to the molar mass of KOH (g/mol).
$N_{KOH}$ is the concentration of the KOH solution (mol/L).
mL sample is the volume of KOH used to titrate the solution (mL).
mL blank is obtained by the titration of a solution made in the same conditions but with no polymers (mL).
Sample weight is the mass of polymer weighted (g).
The result is given in mg KOH/g.

Acid Number

The OH number was determined in accordance with the below reported procedure:

0.5 g of the target polymer was weighted in a glass Erlenmeyer equipped with a magnetic stirrer. The exact amount of polymer was noted. Then, 50 mL of a mixture of toluene/ethanol 1/1 was added. 3-4 drops of phenolphthalein were added and the solution was titrated with a solution of KOH in ethanol at 0.1 mol/L. The acid number (SZ #) is given by the following formula:

$$SZ\# = \frac{(\text{mL sample})(N_{KOH})(56,1)}{\text{sample weight}}$$

56.1 corresponds to the molar mass of KOH (g/mol).
$N_{KOH}$ is the concentration of the KOH solution (mol/L).
mL sample is the volume of KOH used to titrate the solution (mL).
mL blank is obtained by the titration of a solution made in the same conditions but with no polymers (mL).
Sample weight is the mass of polymer weighted (g).
The result is given in mgKOH/g.

Dynamic Viscosity

The dynamic viscosity was measured using an Anton Paar viscometer MCR51 (Kegel Platte GP50-1) at 23° C. 1/100 sec$^{-1}$.

Preparation of Unmodified Polyalkanolamines

Example 1

Synthesis of Polytriethanolamine

A four-neck flask equipped with stirrer, distillation bridge, gas inlet tube, and internal thermometer was charged with 2500 g triethanolamine ("TEA") and 70.8 g of aqueous $H_3PO_2$ (50% by weight) and the mixture so obtained was heated under nitrogen to 200° C. The reaction mixture was stirred at 200° C. for a period of 25 hours, during which the condensate formed in the reaction is removed by means of a moderate stream of $N_2$ as stripping gas via the distillation bridge. Towards the end of the reaction time indicated, the temperature was lowered to 140° C. and residual low molecular weight products were removed under a pressure of 100 hPa. The reaction mixture was cooled to ambient temperature and polytriethanolamine was obtained.

$M_n$=2,100 g/mol
$M_w$=31,800 g/mol
$M_w/M_n$=15.1
OH number: 274 mg KOH/g
Dynamic viscosity at 23° C.: 10,270 mPa·s 1/100 sec Example 2

Synthesis of Polytriisopropanolamine

A four-neck flask equipped with stirrer, distillation bridge, gas inlet tube, and internal thermometer was charged with 2500 g triisopropanolamine ("TIPA") and 30.0 g of aqueous $H_3PO_2$ (50% by weight) and the mixture so obtained was heated under nitrogen to 200° C. The reaction mixture was stirred at 200° C. over a period of 10 hours, during which the condensate formed in the reaction is removed by means of a moderate stream of $N_2$ as stripping gas via the distillation bridge. Towards the end of the reaction time indicated, the temperature was lowered to 140° C. and residual low molecular weight products were removed under a pressure of 100 hPa.

The reaction mixture was cooled to ambient temperature and polytrisopropanolamine polyol was obtained.

$M_n$=2,550 g/mol
$M_w$=6,180 g/mol
$M_w/M_n$=2.4
OH number: 498 mg KOH/g
Dynamic viscosity at 23° C.: 10,200 mPa·s 1/100 sec Synthesis of Modified Polyalkanolamines Example 3

Esterification of Polytriethanolamine with Stearic Acid 65.4 g of PolyTEA, synthesized according to the procedure described in example 1, and 90.9 g of stearic acid were placed in 250 mL flask equipped with stirrer, distillation bridge, gas inlet tube, and internal thermometer. Then 0.016 g of Titan (IV) butoxide were added to the reaction flask, which was heated by means of an oil bad up to 140° C. under nitrogen atmosphere. The reaction mixture was kept for 2½ hours at 140° C. under nitrogen stream and under stirring. Thereafter the pressure was reduced stepwise to 100 hPa. The reaction was followed by measuring the acid numbers. The reaction mixture was stirred under vacuum at 140° C. until the acid number dropped to 4 mgKOH/g.

A solid yellowish polymer mass was obtained with the following analytics:

Acid number: 4 mg KOH/g
OH number: 3 mg KOH/g

Example 4

Esterification of Polytrisopropanolamine with Stearic Acid 40.0 g of PolyTIPA, synthesized according to the procedure described in example 2, and 101 g of stearic acid were placed in 250 mL flask equipped with stirrer, distillation bridge, gas inlet tube, and internal thermometer. Then 0.028 g of Titan (IV) butoxide were added to the reaction flask, which was heated by means of an oil bad up to 140° C. under nitrogen atmosphere. The reaction mixture was kept for 4 hours at 140° C. under Nitrogen stream and under stirring.

Thereafter, the pressure was stepwise reduced to 100 hPa. The reaction was followed by measuring the acid numbers. The reaction mixture was stirred under vacuum at 140° C. until the acid number dropped to 4 mgKOH/g.

A solid yellowish polymer mass was obtained with the following analytics:

Acid number: 3 mgKOH/g
OH number: 0 mgKOH/g

Wax Inhibition

The cold finger deposition test was utilized to determine the wax inhibition properties of the modified polyalkanolamines. The wax inhibition was determined by exposing the crude oil to a cold metal finger surface in the presence and absence of the inhibitor. The amount and type of wax deposited on the cold metal finger was used to determine waxing tendency.

For the tests, a crude oil from the "Landau" oilfield in south-west Germany (Wintershall Holding GmbH) having an API gravity of 37 and a pour point of 21° C. was used.

The test was started by conditioning the oil sample by heating to 80° C. and holding for 30 minutes to remove thermal history. A water bath on the cold finger apparatus was adjusted so that the oil temperature is maintained at 30° C. The cold finger was maintained at 15° C. and the cold finger was inserted into oil sample. The test was run for 6 hours. The cold finger was removed the wax deposit was removed with a previous weighed paper towel. The wax deposit was weighed.

The wax test was repeated in the presence and absence of the modified polyalkanolamines. The amount of copolymers used was 1000 ppm (added as solution of 10% copolymer in Solvesso® 150 (mixture of aromatic hydrocarbons (aromatic content >99%), distillation range 182-207° C.) with respect to crude oil. The percent efficacy was calculated on the performance of paraffin inhibitor as compared to the baseline (i.e. the measurement without wax inhibitor).

Each test was performed twice and the average of the two tests calculated. The results are summarized in the following table 1.

TABLE 1

Summary of the wax deposition tests

| Example No. | Polymers used | Conc./ppm | Oil Batch No.* | Wax deposit/g Average (test1; test2) | % Inhibition |
| --- | --- | --- | --- | --- | --- |
| Comparative example 1 | — | — | 1 | 2.69 (2.81; 2.56) | 0 |
| Example 5 | Example 3 | 1000 | 1 | 1.91 (1.81; 2.01) | 29 |
| Comparative example 2 | — | — | 2 | 3.21 (3.15; 3.27) | 0 |
| Example 6 | Example 4 | 1000 | 2 | 2.65 (2.51; 2.78) | 18 |

(*Although oil of the same source was used, different batches may have slightly different properties. Therefore, a comparative example was performed for each of the batches)

The tests show that a significant wax inhibition effect is achieved by the use of the modified polyalkanolamines.

The invention claimed is:

1. A method of preventing wax deposits on surfaces in contact with crude oil, mineral oil and/or mineral oil products, comprising adding at least one hydrophobically modified, branched polyalkanolamine (III) to the crude oil, mineral oil and/or mineral oil products, wherein the at least one hydrophobically modified, branched polyalkanolamines (III) is obtained by the following process (A) condensing at least one trialkanolamine of the general formula $N(R^1-OH)_3$ (Ia) thereby obtaining branched polyalkanolamines (II) comprising terminal OH groups, wherein the $R^1$ moieties are each independently divalent, linear or branched aliphatic hydrocarbon moieties having from 2 to 6 carbon atoms, and (B) reacting at least one of the terminal OH groups of the branched polyalkanolamines (II) with a reagent $R^6-X$ (IV), wherein $R^6$ is an aliphatic, linear or branched, saturated or unsaturated hydrocarbon group having 8 to 100 carbon atoms and X is a functional group capable of reacting with OH-groups;

wherein in stage (B) at least 50% of the terminal OH groups are reacted with a reagent $R^6-X$ (IV).

2. The method according to claim 1, wherein (Ia) is at least one trialkanolamine selected from the group consisting of triethanolamine, triisopropanolamine and tributan-2-olamine.

3. The method according to claim 1, wherein besides the trialkanolamines (Ia) at least one additional monomer selected from monomers (Ib) and (Ic) is used in course of step (A), wherein (Ib) are dialkanolamines having the general formula $R^2-N(R^1-OH)_2$ (Ib), wherein $R^2$ is hydrogen and/or linear or branched aliphatic, cycloaliphatic and/or aromatic hydrocarbon radicals having from 1 to 30 carbon atoms, and (Ic) are monomers different from (Ia) and (Ib) and having at least two hydroxyl and/or amino groups may be used for the polycondensation.

4. The method according to claim 1, wherein the amount of trialkanolamines (Ia) is at least 50% by weight relating to all monomers used for the polycondensation.

5. The method according to claim 1, wherein $R^6$ has 10 to 32 carbon atoms.

6. The method according to claim 1, wherein the reactant $R^6-X$ (IV) is a carboxylic acid or an activated carboxylic acid derivative.

7. The method according to claim 1, wherein the hydrophobically modified, branched polyalkanolamines (III) are added as formulation in a suitable solvent.

8. The method according to claim 1, wherein the groups $R^6$ comprise linear, aliphatic saturated hydrocarbon groups $R^{6a}$.

9. The method according to claim 1, wherein at least 50% of the groups $R^6$ are linear, aliphatic saturated hydrocarbon groups $R^{6a}$.

10. The method according to claim 1, wherein the formulation used additionally comprises at least one wax dispersant.

11. The method according to claim 1, wherein the amount added is 50 to 1500 ppm of the hydrophobically modified, branched polyalkanolamines (III) based on the crude oil, mineral oil and/or mineral oil products.

12. The method according to claim 10, wherein the oil is crude oil.

13. The method according to claim 12, wherein a formulation comprising a hydrophobically modified, branched polyalkanolamine (III) and a suitable solvent is injected into a crude oil pipeline.

14. The method according to claim 12, wherein a formulation comprising a hydrophobically modified, branched polyalkanolamine (III) and a suitable solvent is injected into a production well.

15. The method according to claim 13, wherein the injection is effected on an offshore platform.

16. A method comprising adding a pour point depressant to crude oil, mineral oil and/or mineral oil products, wherein the pour point depressant is at least one hydrophobically modified, branched polyalkanolamine (III) obtained by the following process
  (A) condensing at least one trialkanolamine of the general formula $N(R^1-OH)_3$ (Ia) thereby obtaining branched polyalkanolamines (II) comprising terminal OH groups, wherein the $R^1$ moieties are each independently divalent, linear or branched aliphatic hydrocarbon moieties having from 2 to 6 carbon atoms, and
  (B) reacting at least one of the terminal OH groups with a reagent $R^6-X$ (IV), wherein $R^6$ is an aliphatic, linear or branched, saturated or unsaturated hydrocarbon group having 8 to 100 carbon atoms and X is a functional group capable of reacting with OH-groups; wherein in stage (B) at least 50% of the terminal OH groups are reacted with a reagent $R^6-X$ (IV).

17. A method of making a lubricating oil composition comprising mixing at least
  (a) one base oil component,
  (b) at least one hydrophobically modified polyalkanolamine (III), and
  (c) additives;
wherein the at least one hydrophobically modified polyalkanolamine (III) is obtained by the following process
  (A) condensing at least one trialkanolamine of the general formula $N(R^1-OH)_3$ (Ia) thereby obtaining branched polyalkanolamines (II) comprising terminal OH groups, wherein the $R^1$ moieties are each independently divalent, linear or branched aliphatic hydrocarbon moieties having from 2 to 6 carbon atoms, and
  (B) reacting at least one of the terminal OH groups with a reagent $R^6-X$ (IV), wherein $R^6$ is an aliphatic, linear or branched, saturated or unsaturated hydrocarbon group having 8 to 100 carbon atoms and X is a functional group capable of reacting with OH-groups; wherein in stage (B) at least 50% of the terminal OH groups are reacted with a reagent $R^6-X$ (IV).

18. The method according to claim 17, wherein the lubricating oil composition comprises
  (a) 0.1 to 30% by wt. of the at least one hydrophobically modified polyalkanolamine (III),
  (b) 70 to 99.9% by wt. base oil, and
  (c) 0.05 to 20% by wt. of additives.

19. The method according to claim 17, wherein the lubricating oil composition comprises at least one additive selected from the group consisting of antioxidants, oxidation inhibitors, corrosion inhibitors, friction modifiers, metal passivators, rust inhibitors, anti-foamants, viscosity index enhancers, additional pour-point depressants, dispersants, detergents, further extreme-pressure agents and/or anti-wear agents.

* * * * *